United States Patent [19]

Kapan

[11] Patent Number: 5,291,293
[45] Date of Patent: Mar. 1, 1994

[54] ELECTRONIC IMAGING DEVICE WITH DEFECT CORRECTION

[75] Inventor: Martin C. Kapan, Rochester, N.Y.

[73] Assignee: Eastman Kodak Company, Rochester, N.Y.

[21] Appl. No.: 891,145

[22] Filed: Jun. 1, 1992

[51] Int. Cl.⁵ .......................................... H04N 5/335
[52] U.S. Cl. ..................................... 348/246; 348/251
[58] Field of Search ............... 358/213.17, 213.11, 358/213.15, 163, 167, 41, 51, 52; 250/208.1; 382/50, 52; H04N 5/335, 5/280

[56] References Cited

U.S. PATENT DOCUMENTS

| | | | |
|---|---|---|---|
| 4,524,390 | 6/1985 | Lemke | 358/213.17 |
| 4,590,520 | 5/1986 | Frame et al. | 358/163 |
| 4,605,956 | 8/1986 | Cok | 358/44 |
| 4,630,307 | 12/1986 | Cok | 382/25 |
| 4,661,713 | 4/1987 | Besson et al. | 250/578 |
| 4,663,655 | 5/1987 | Freeman | 358/41 |
| 4,701,784 | 10/1987 | Katsuoka et al. | 358/213.17 |
| 4,734,774 | 3/1988 | Skaggs et al. | 358/213.15 |
| 4,739,495 | 4/1988 | Levine | 364/571 |
| 4,774,565 | 9/1988 | Freeman | 358/41 |
| 4,796,085 | 1/1989 | Shinada | 358/75 |
| 4,858,013 | 8/1989 | Matsuda | 358/213.17 |
| 4,894,721 | 1/1990 | Matsuda | 358/213.17 |
| 5,047,861 | 9/1991 | Houchin et al. | 358/213.15 |
| 5,047,863 | 9/1991 | Pape et al. | 358/213.16 |

FOREIGN PATENT DOCUMENTS

| | | | |
|---|---|---|---|
| 58-96466 | 6/1983 | Japan | H04N 5/30 |
| 1-137783 | 5/1989 | Japan | H04N 5/335 |

*Primary Examiner*—Michael T. Razavi
*Assistant Examiner*—Tuan V. Ho
*Attorney, Agent, or Firm*—David M. Woods

[57] ABSTRACT

An improved electronic imaging device is provided that utilizes redundant sensor elements for defect compensation. In addition, the signal generated from the redundant sensor elements is used to improve the signal to noise response of the electronic imaging device. In an electronic color imaging device, the need for total redundancy of sensor elements is obviated by using a single luminance array of sensor elements to provide defect correction data for defective sensor elements located in red, green and blue arrays.

8 Claims, 3 Drawing Sheets

ELECTRONIC IMAGING DEVICE WITH DEFECT CORRECTION

BACKGROUND OF THE INVENTION

The invention relates in general to electronic imaging devices that are capable of compensating for defective sensor elements contained therein.

Electronic imaging devices having an array of sensor elements that convert incident scene light to electrical signals are utilized in a variety of products. For example, linear electronic imaging devices, which include a plurality of sensor elements configured in a line, are commonly used in scanning devices, such as facsimile machines, to scan an original document on a line-by-line basis in order to generate electrical signals that correspond to the image of the original document. The electrical signals can then be used to reproduce the image of the original document in either hard copy or electronic form.

It is desirable to reproduce the image of the original document with a high degree of resolution. Thus, the electronic imaging device employed to scan the document should preferably have a large number of sensor elements. It is difficult and expensive, however, to produce high resolution electronic imaging devices without defective sensor elements. Present manufacturing methods form of a large number of electronic imaging devices on a semiconductor wafer and then use a sorting process to identify those devices on the wafer that do not have sensor element defects. The percentage yield of good devices, however, generally decreases with increasing resolution, as higher resolution devices necessarily require a greater surface area which increases the chance that a defect in the wafer will fall within the structure of a particular device. A great deal of effort and material is wasted if the percentage yield of good devices from each wafer is low.

One approach to increasing the yield of devices that can be utilized is to provide redundant sensor elements within the structure of the electronic imaging device to compensate for defective sensor elements. U.S. Pat. No. 4,661,713 issued to Besson et al., for example, discloses a photovoltaic diode detection device that includes two diode arrays. Each of the diode arrays includes defective diode elements. A programmed memory is used to control two switches to accomplish a winding or serpentine readout of the arrays, wherein the signals from only the good diode elements in each of the arrays are readout. A disadvantage of this approach, particularly in a color scanning system having separate red, green and blue arrays of sensor elements, is that total redundancy of sensor elements is required.

It is an object of the invention to provide an improved electronic imaging device that utilizes redundant sensor elements to provide defect compensation for defective sensor elements, and to provide an improvement in the overall response of the electronic imaging device. It is a further object of the invention to provide an improved electronic imaging device that does not require total redundancy of all sensor elements in a color scanning system.

SUMMARY OF THE INVENTION

An improved electronic imaging device is provided that utilizes redundant sensor elements for defect compensation. In addition, the signal generated from the redundant sensor elements is used to improve the signal to noise response of the electronic imaging device. In an electronic color imaging device, the need for total redundancy of sensor elements is obviated by using a single luminance array of sensor elements to provide defect correction data for defective sensor elements located in red, green and blue arrays.

BRIEF DESCRIPTION OF THE DRAWINGS

With the above as background, reference should now be made to the following detailed discussion of the modes of carrying out the invention and the accompanying drawings, wherein.

MODES OF CARRYING OUT THE INVENTION

Figure 1:
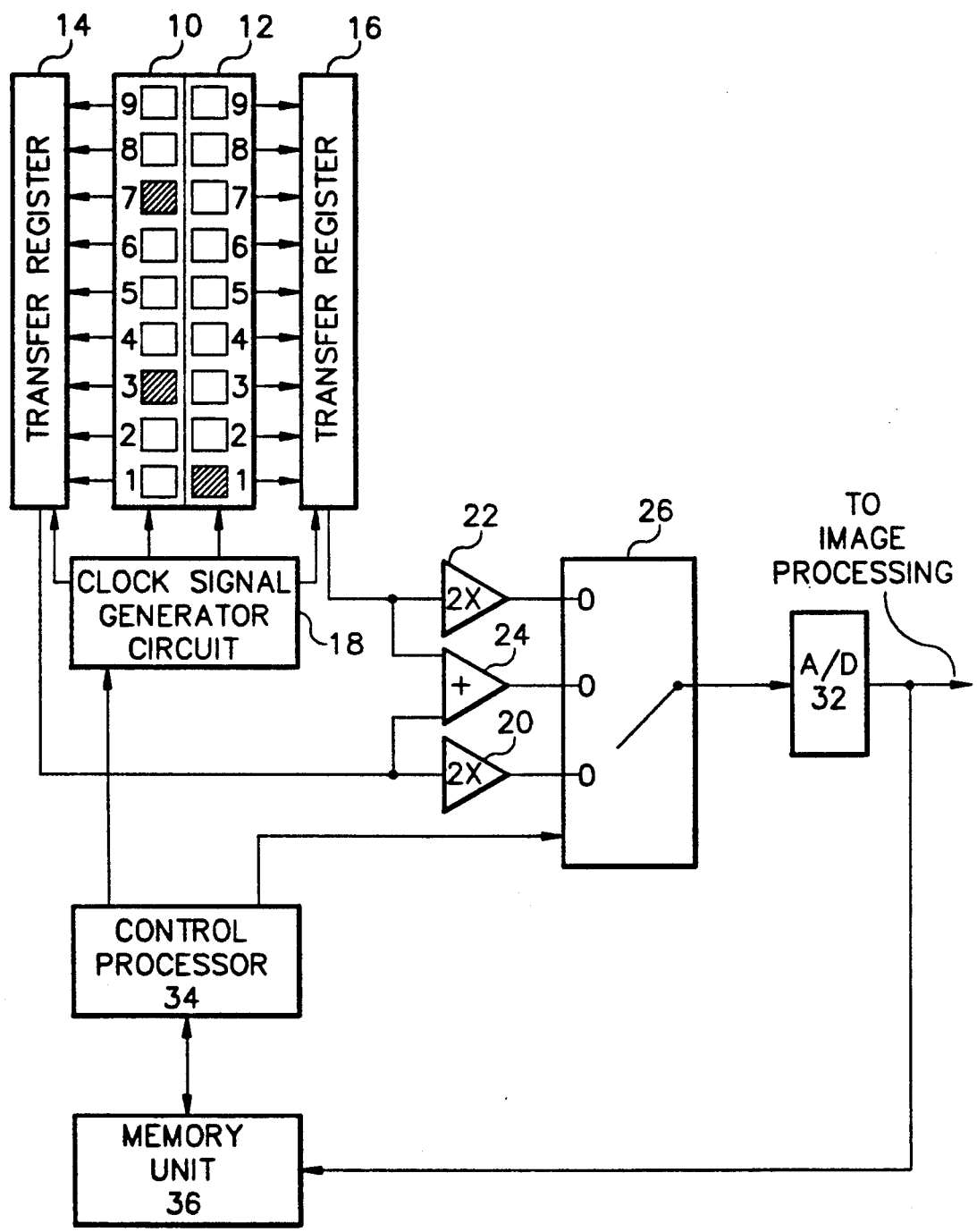
FIG. 1 is a block diagram of an electronic imaging device in accordance with the invention.

Referring now to FIG. 1, a block diagram of an electronic image sensor in accordance with the invention is shown including a first linear array of sensor elements a second linear array of corresponding sensor elements 12, first and second transfer registers 14, 16 corresponding to the first and second linear array of sensor elements 10, 12, and a clock signal generator circuit 18 coupled to the first and second linear array of sensor elements 10, 12 and the first and second transfer registers 14, 16. The output lines from the first and second transfer registers 14, 16 are respectively coupled to first and second defect correction amplifiers 20, 22. In addition, the output lines from the first and second transfer registers 14, 16 are also coupled to a summing amplifier 24. A switching unit 26 is provided to selectively supply the output from either the first defect correction amplifier 20, the second defect correction amplifier 22 or the summing amplifier 24 to the input an analog-to-digital (A/D) converter 32. A control processor 34 is provided to control the overall operation of the clock signal generator circuit 18 and the switching unit 26. A memory unit 36 is also coupled to the control processor 34 and to the output of the A/D converter 32.

The gain of the summing amplifier 24 is set to amplify the combined output signal from corresponding functioning sensor elements in the first and second linear arrays 10, 12 to an appropriate output level before the analog signal is supplied to the A/D converter 32. The gain of the defect correction amplifiers 20, 22 is set to be twice the gain of the summing amplifier 24. The gain is doubled in the defect correction amplifiers 20, 22, as will be described in greater detail below, in order to compensate for the lack of signal from a defective sensor element in one of the linear arrays by doubling the output response of a functioning sensor element in the other linear array that corresponds to the defective sensor element.

The location of defective sensor elements within the first and second linear arrays 10, 12 are identified and stored in the memory unit 36. The electronic image sensor, for example, is exposed to a test level illumination and the output signal from the first linear array 10 is supplied to the A/D converter 32 via the amplifier 22 and the switching unit 26. The A/D converter 32 converts the analog signals generated by the first linear array 10 and amplified by the amplifier 22 to digital image signals which are then stored in the memory unit 36. The control processor 34 compares the stored digital image signals with predetermined thresholds to identify which sensor elements of the array are not producing an acceptable output signal. The locations of the identified defective sensor elements are then stored in the memory unit 36 for future reference and the process is then repeated for the second linear array 12.

The identification of the defective sensor elements is preferably accomplished at an initial manufacturing phase and then stored in nonvolatile memory within the memory unit 36. Subsequent tests can then be performed to update the defect information in order to identify additional sensor element failures if desired. In addition, the output signals from corresponding sensor elements can be directly compared to identify defect sensor elements.

During imaging operations, the output signals from corresponding sensor elements within the first and second linear arrays 10, 12 are combined if both sensor elements are not defective, i.e., the output signals from corresponding functional sensor elements are passed to the A/D converter 36 via the summing amplifier 24 and the switching unit 26. If one of the sensor elements in an array is defective, however, the switching unit 26 selects the output signal from the defect correction amplifier coupled to the opposite array which doubles the signal response from the functioning sensor element in order to compensate for the defective sensor element.

A more detailed explanation of the imaging operations will be provided with further reference to FIG. 1, in which defective sensor elements are illustrated by cross-hatching. Defective sensor elements are first identified using the above-described method of comparing the output response of the sensor elements to preselected test illumination levels. In the illustrated example, sensor elements 3 and 7 of the first linear array 10 and sensor element 1 of the second linear array 12 are identified as being defective. The location of each of the defective sensor elements is then stored in the memory unit 36. During operation, the control processor 34 controls the switching unit 26 to select the output signal from the defect correction amplifier 20 when the signal corresponding to the defective sensor element 1 of the second linear array 12 is being readout from the transfer register 16. The signal from the functional sensor element 1 of the first linear array 10 is therefore doubled, with respect to the amplification employed when both sensor elements are functional, in order to compensate for the lack of signal from the nonfunctional sensor element I of the second linear array 12. As the readout of the sensor elements continues, the control processor 34 controls the switching unit 26 to select the output signal from the summing amplifier 24, as both of the sensor elements 2 of the first and second arrays 10, 12 are functional. Next, the control processor 34 controls the switching unit 26 to select the output signal from the defect correction amplifier 22, as sensor element 3 of the first linear array 10 is defective and sensor element 3 of the second linear array 12 is functional. The operation of the electronic image sensor continues in the above manner until all of the signals generated by the sensor elements have been readout.

The structure of the electronic image sensor illustrated in FIG. 1 not only provides correction for defective sensor elements, but also improves the signal to noise response of the electronic image sensor by combining the signal from two corresponding functional sensor elements, rather than simply discarding the information from one of the functional sensor elements when redundancy for defect correction is not required. Thus, the invention provides an improved electronic image sensor structure over conventional devices that utilize the output signal from only one sensor element when defect correction is not required.

Figure 2:
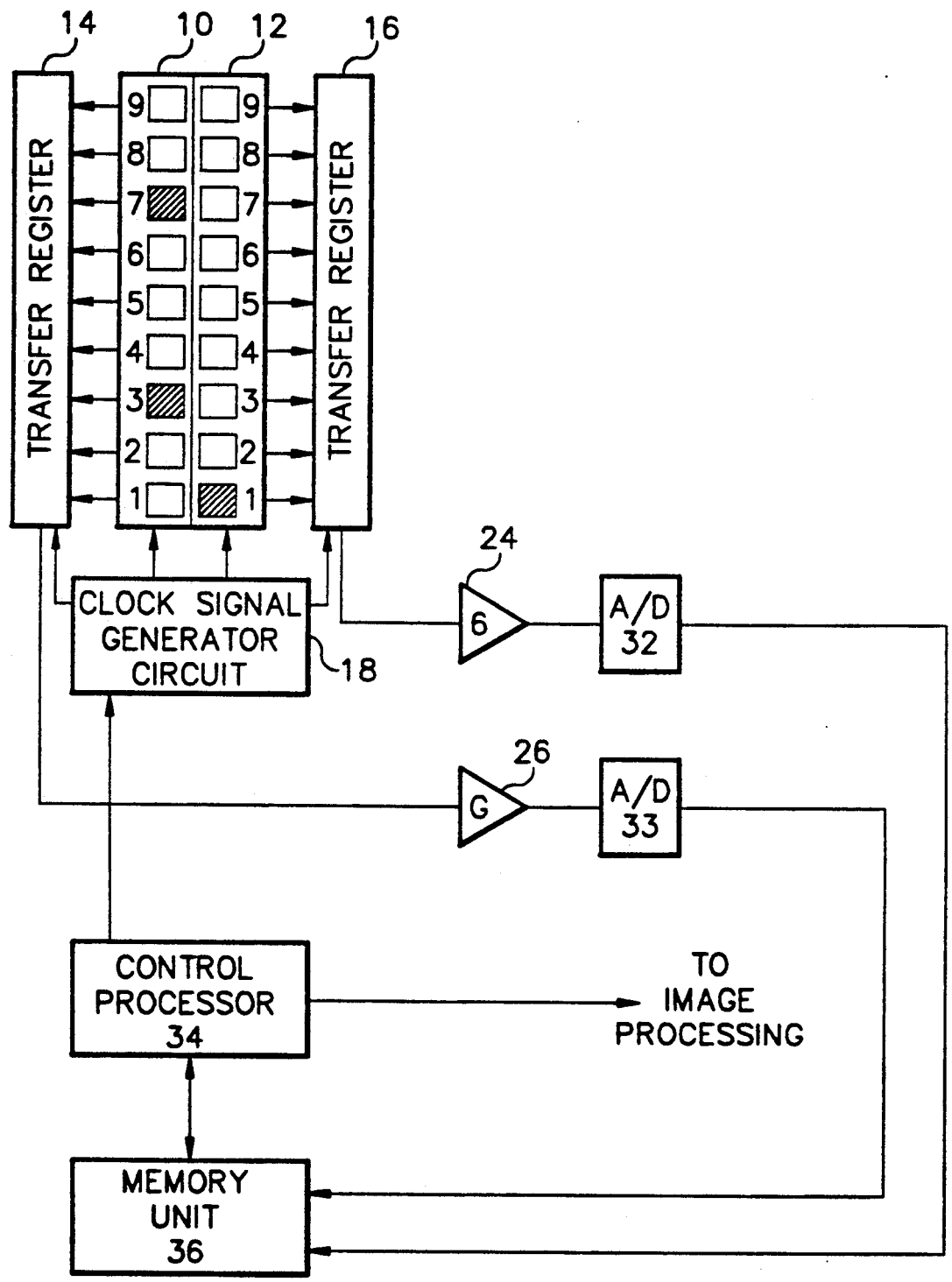
FIG. 2 illustrates a modification of the electronic imaging device shown in FIG. 1.

The defect correction and the combination of the signals from corresponding sensor elements to improve the signal to noise response can also be accomplished after digitization in order to simplify the structure of the electronic imaging device. As shown in the embodiment of FIG. 2, the switching unit 26 and defect correction amplifiers 20, 22 are removed and the output lines from the transfer registers 14, 16 are directly connected to the amplifiers 24, 26. The outputs of the amplifiers 24, 26 are then coupled to corresponding A/D converters 32, 33, which in turn are connected to the memory unit 36.

During operation, the signals generated by the sensor elements in the linear arrays 10 and 12 are readout, digitized and stored in the memory unit 36. The control processor 34 then performs the functions of combining the digitized signals from corresponding sensor elements if both elements are functional, or doubling the response of a functional sensor element if its corresponding sensor element is defective, to generate an image output signal.

Figure 3:
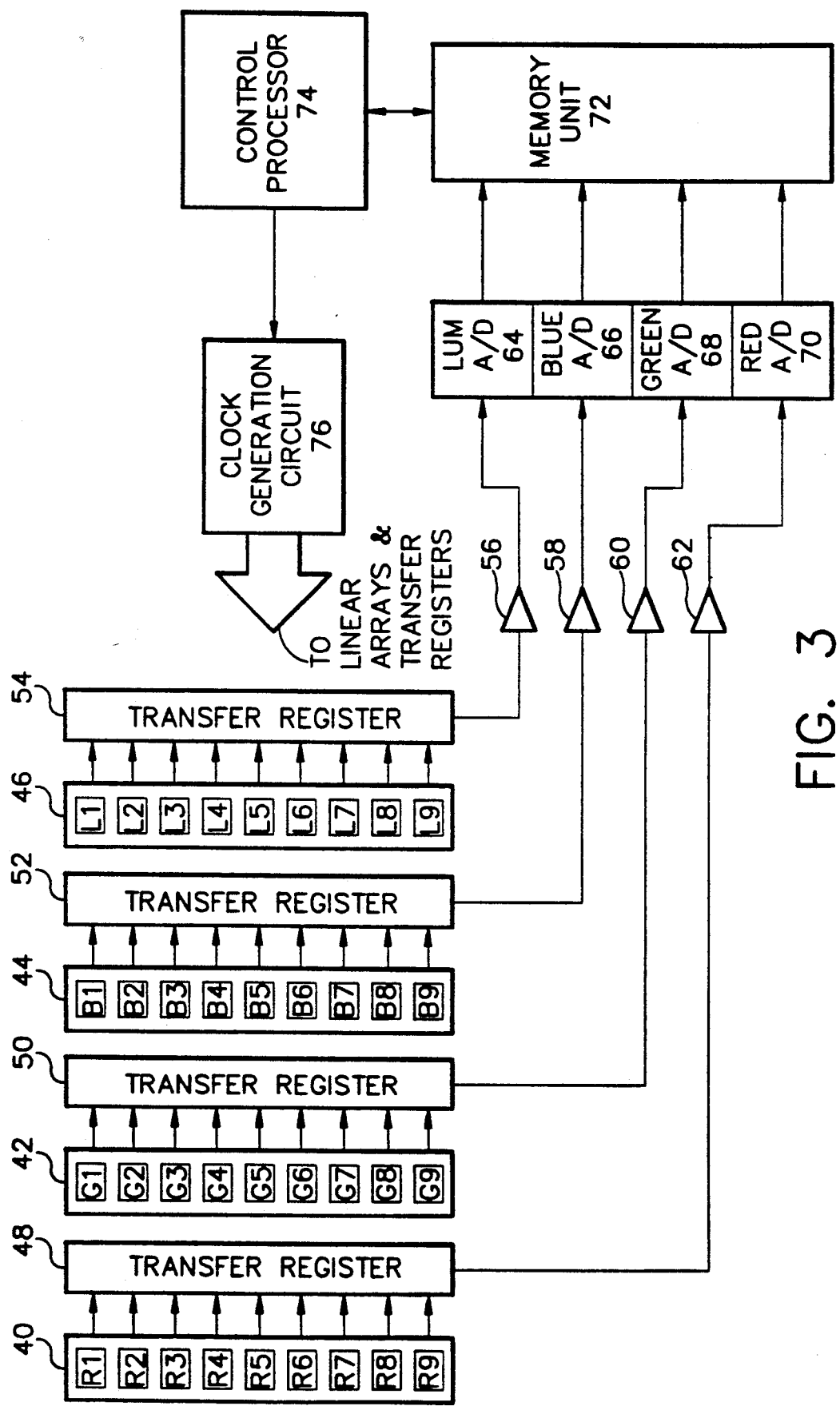
FIG. 3 is a block diagram of a color electronic image sensor device in accordance with the invention.

Referring now to FIG. 3, a functional block diagram of an electronic color imaging device in accordance with the invention is shown including a red linear image array 40, a green linear image array 42, a blue linear image array 44, and a luminance linear array 46 coupled to corresponding transfer registers 48-54. The output lines of the transfer registers 48-54 are coupled to corresponding output amplifiers 56-62, which in turn are connected to corresponding A/D converters 64-70. The output lines of the A/D converters 64-70 are connected to a memory unit 72. The overall operation of the imager is controlled by a control processor 74, which calculates a defect correction signal for defective sensor elements as will be described in greater detail below.

The electronic color imaging device is first exposed to a predetermined test illumination level in order to identify defective sensor elements within the red, green, and blue linear arrays 40-44. The locations of the defective sensor elements are stored in the memory unit 72 in a manner similar to that described for the embodiment shown in FIG. 1. During actual imaging operations, data from the red, green, blue and luminance linear arrays 40-46 are readout via the transfer registers 48-54, amplified by the amplifiers 56-62, and stored in the memory unit 72. The control processor 74 then utilizes the data generated from the luminance linear array 46 to correct for defective sensor elements in the red, green and blue luminance linear arrays 40-44.

In the illustrated embodiment, for example, data is needed from each of three corresponding red, green and blue sensor elements (R1, G1, B1) to generate a signal for complete color image pixel. If one of the sensor elements is defective, for example the red sensor element R1, the control processor 74 calculates a response for the defective sensor element by utilizing the data available from the corresponding luminance sensor element L1. The luminance sensor element L1 has a response (L) that is related to the responses of each of the red (R), green (G) and blue (B) sensor elements by predetermined factors (Fr, Fg, Fb), i.e., L=Fr(R)+Fg(G)+Fb(B). Thus, a response for a defective sensor element can be calculated if the responses of the luminance sensor element and the remaining functional sensor elements are known using the appropriate one of the following equations:

$$R=(L-Fg(G)-Fb(B))/Fr$$

$$G=(L-Fr(R)-Fb(B))/Fg$$

$$B=(L-Fr(R)-Fg(G))/Fb$$

In addition to defect correction, the response from the sensor elements within the luminance array 46 may also be combined with the responses of the corresponding sensor elements within the red, green and blue linear arrays 40-44 to improve signal to noise ratios. The appropriate combination depends on the use of the device. For example, if it is desired to use the device to output luminance/chrominance type signals, the following outputs would be appropriate: Combined Luminance Fr(R)+Fg(G)+Fb(B)+L; Red=R; and Blue=B; where a defect in L can be corrected by doubling the response of (Fr(R)+Fg(G)+Fb(B)). Alternatively, all four signals R, G, B and L can be output for further signal processing.

The structure of the electronic color imaging device illustrated in FIG. 3 also provides the advantage of not having to provide redundant sensor elements for each of the sensor elements contained within the red, green and blue linear arrays 40-44, i.e., the single luminance linear array 46 is used to correct for defective sensor elements within any of the three color arrays.

The invention has been described with reference to certain preferred embodiments thereof. It will be understood, however, that modifications and variations are possible within the scope of the appended claims. The invention, for example, can be implemented in devices that use any number of arrays. One such variation would include the use of two corresponding red, two corresponding blue and two corresponding green arrays, with the above described defect correction structure implemented with respect to each set of arrays.

What is claimed is:

1. An electronic imaging device comprising: first and second arrays of corresponding sensor elements that generate electrical signals in response to incident radiation, wherein said first and second arrays may included some defective sensor elements, corresponding sensor elements of the first and second arrays being arranged in sensor element pairs aligned along a scanning direction, each of said pairs comprising at least one functional sensor element; first and second transfer means for carrying out the readout of the electrical signals generated respectively by the sensor elements of said pairs; defect identification means for identifying defective sensor elements in said first and second arrays; and output means for receiving the electrical signals from said first and second transfer means and for combining the electrical signals generated by corresponding sensor elements of said sensor element pairs when both sensor elements are functional and for increasing the level of the electrical signal generated by a functional sensor element of a pair to a defect compensation level when the other sensor element of said pair is not functional wherein the output means includes a defect correction amplifier coupled to an output of said first transfer means, a second defect correction amplifier coupled to an output of said second transfer means, and a summing amplifier coupled to the outputs of both the first and second transfer means, said output means providing corrected output image signals.

2. The electronic imaging device as claimed in claim 1, wherien the output means further comprises switching means for selecting an output signal from one of the first defect correction amplifier, the second defect correction amplifier and the summing amplifier; and digitizing means coupled to the switching means for digitizing said electrical signals.

3. The electronic imaging device as claimed in claim 1, wherien the output means includes digitizing means coupled to the output of said first and second transfer means for digitizing the electrical signals and processing means coupled to said digitizing means for providing said corrected output image signals.

4. A method of improving the signal to noise response and of compensating for defective sensor elements in an electronic imaging device comprising first and second arrays of corresponding sensor elements that generate electrical signals in response to incident radiation, wherien said first and second arrays may includes some defective sensor elements, corresponding sensor elements of the first and second arrays being arranged in sensor element pairs aligned along a scanning direction, each of said pairs comprising at least one functional sensor element, said method comprising the steps of:
  a) identifying defective sensor elements in said first and second arrays;
  b) reading out the electrical signals generated by the sensor elements of said first and second arrays;
  c) summing the electrical signals generated by corresponding sensor elements of said sensor element pairs of first and second arrays when both sensor elements are functional; and amplifying the level of the electrical signal generated by a functional sensor element of a pair of first and second arrays, to a defect compensation level when the other element of said pair is not functional.

5. An electronic imaging device comprising:
  a) a plurality of at least four arrays of correspondents sensor elements that generate electrical signals in response to incident radiation wherein said plurality of four arrays is comprised of: a first array of red sensor elements; a second array of green sensor elements; a third array of blue sensor elements; and a fourth array of luminance sensor elements, corresponding sensor elements of said plurality of at least four arrays being arranged in sensor element sets, aligned along a scanning direction, the electrical signal from each sensor element of a set being a function of a combination of the electrical signals of the other sensor elements of said set, wherein said plurality of at least four arrays may include some defective sensor elements;
  b) a plurality of transfer means for carrying out the readout of the electrical signals generated by the sensor elements of said plurality of at least four arrays;
  c) defect identification means for identifying defective sensor elements in said plurality of at least four arrays; and
  d) output means comprising means for, in the event of a defective sensor element in one of said sensor element sets, generating a compensation signal for the defective sensor element, from the electrical signals of the functional sensor elements of said fourth array of luminance sensor elements.

6. An electronic imaging device according to claim 5, wherien said output means further comprise means for combining electrical signals of sensor elements within said sensor element sets.

7. A method of compensating for defective sensor elements in an electronic imaging device comprising a plurality of at least four arrays of corresponding sensor elements that generate electrical signals in response to incident radiation wherein said plurality of four arrays is comprised of: a first array of red sensor elements; a second array of green sensor elements; a third array of blue sensor elements; and a fourth array of luminance sensor elements corresponding sensor elements of said plurality of at least four arrays being arranged in sensor element sets aligned along a scanning direction, the electrical signals from each sensor element of a set being a function of a combination of the electrical signals of the other elements of said set, wherien said plurality of at least four arrays may include some defective sensor elements, said method comprising the steps of:

a) identifying defective sensor elements in said plurality of at least four arrays;

b) reading out the electrical signals generated by the sensor elements of said plurality of at least four arrays;

c) in the event of a defective sensor element in one of said sensor element sets, generating a compensation signal for the defective sensor element from the electrical signals of the functional sensor elements of said fourth array of luminance sensor elements.

8. A method according to claim 7 further comprising the step of combining electrical signals of sensor elements within said sensor element sets so that an improved signal to noise ratio output image is provided.

* * * * *

UNITED STATES PATENT AND TRADEMARK OFFICE
CERTIFICATE OF CORRECTION

PATENT NO. : 5,291,293
DATED : March 1, 1994
INVENTOR(S) : Martin C. Kaplan

It is certified that error appears in the above-indentified patent and that said Letters Patent is hereby corrected as shown below:

On the title page, Item [75]: Inventor should read --Martin C. Kaplan--

Signed and Sealed this

Twelfth Day of July, 1994

Attest:

BRUCE LEHMAN

Attesting Officer     Commissioner of Patents and Trademarks